US008837481B2

(12) United States Patent
Eddleston et al.

(10) Patent No.: US 8,837,481 B2
(45) Date of Patent: *Sep. 16, 2014

(54) INLINE PACKET REPLICATION IN NETWORK DEVICES

(71) Applicant: Calix, Inc., Petaluma, CA (US)

(72) Inventors: Charles J. Eddleston, Minneapolis, MN (US); Christopher T. Bernard, Wayzata, MN (US); Duane M. Butler, Anoka, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,400

(22) Filed: Nov. 5, 2012

(65) Prior Publication Data

US 2013/0058337 A1    Mar. 7, 2013

Related U.S. Application Data

(63) Continuation of application No. 12/756,537, filed on Apr. 8, 2010, now Pat. No. 8,325,727.

(51) Int. Cl.
*H04L 12/28* (2006.01)
*H04J 3/26* (2006.01)
*H04J 14/00* (2006.01)

(52) U.S. Cl.
USPC .............................. 370/390; 370/432; 398/66

(58) Field of Classification Search
None
See application file for complete search history.

(56) References Cited

U.S. PATENT DOCUMENTS

| | | | | |
|---|---|---|---|---|
| 2005/0058118 | A1* | 3/2005 | Davis et al. | 370/351 |
| 2007/0025352 | A1* | 2/2007 | Tanaka | 370/390 |
| 2007/0264017 | A1* | 11/2007 | Mizutani et al. | 398/72 |
| 2010/0098076 | A1* | 4/2010 | Levy et al. | 370/390 |
| 2011/0235635 | A1* | 9/2011 | Yadav | 370/390 |

OTHER PUBLICATIONS

Packet processing solutions for broadband access applications, Altera, Aug. 2007, 2 pages.
Bisson, "Managing Memory Usage in VPLS-Enabled NPU Designs," CommsDesign, Jul. 22, 2004, 6 pages.
Technical White Paper, Virtual Private LAN Services: The Evolution of Layer 2 VPNs, Alcatel, 2003, 28 pages.
ITU-T Recommendation G.984.3, Series G: Transmission Systems and Media Digital Systems and Networks, Digital sections and digital line system—Optical line systems for local and access networks, Gigabit-capable Passive Optical Networks (G-PON): Transmission convergence layer specification, Feb. 2004, 116 pages.

(Continued)

*Primary Examiner* — Clemence Han
(74) *Attorney, Agent, or Firm* — Shumaker & Sieffert, P.A.

(57) ABSTRACT

In general, techniques are described for inline packet replication in network devices. A network device referred to as an optical line terminal (OLT) may implement the techniques. The OLT comprises a customer interface that supports different logical interfaces to which couple a plurality of optical network terminals (ONTs) and a network interface that receives a data unit. The OLT further comprises a conversion unit, such as a media access control (MAC) module, located in a data path of the optical line terminal that determines whether the received data unit is a candidate for replication. The conversion unit includes an inline packet processing module that performs replication to generate at least one copy of the data unit based on the determination that the received packet is a candidate for packet replication. The customer interface outputs the at least one copy of the data unit to the ONTs.

25 Claims, 4 Drawing Sheets

(56) References Cited

OTHER PUBLICATIONS

IEEE Std 802.1Q-1998, IEEE Standards for Local and Metropolitan Area Networks: Virtual Bridged Local Area Networks, Mar. 8, 1999, 211 pages.

Office action for U.S. Appl. No. 12/756,537, dated Apr. 13, 2012, 6 pages.
Response to office action for U.S. Appl. No. 12/756,537, filed Jul. 11, 2012, 13 pages.

* cited by examiner

INLINE PACKET REPLICATION IN NETWORK DEVICES

This application is a Continuation of application Ser. No. 12/756,537, filed on Apr. 8, 2010, the entire contents of which are incorporated herein by reference.

TECHNICAL FIELD

The disclosure relates to computer networking and, more particularly, to performing replication in network devices.

BACKGROUND

An optical network, such as a passive optical network (PON) as an example, often delivers voice, video and/or other data among multiple network nodes. In the case of a PON, the network nodes are often referred to as optical network terminals (ONTs). The PON can deliver data among multiple ONTs using a common optical fiber link. Passive optical splitters and combiners enable multiple ONTs to share the optical fiber link. An optical line terminal (OLT) transmits information downstream to the ONTs, and receives information transmitted upstream from the ONTs. Each ONT terminates the optical fiber link for a residential or business subscriber, and is sometimes referred to as a subscriber or customer premises node.

Each ONT is connected to one or more customer premises equipment (CPE) devices, which ultimately receive the voice, video and other data delivered via the PON. Examples of CPE devices include computers, telephones, television set-top boxes or the like. An ONT on a PON may receive traffic from several sources. Some sources may be commonly used among several ONTs on a PON. For example, several ONTs may access a common traffic flow associated with switched digital video (SDV) or other multicast streams. Other sources may produce traffic flows that are unique to an individual ONT. For example, an individual ONT may receive web content from an Internet service provider (ISP) or voice data from the public switched telephone network (PSTN).

Delivery of data from a given OLT to multiple ONTs often involves replication of data packets. For example, multiple ONTs may each service subscriber stations that have joined a given multicast group that provides the same video, audio or other data to each of the subscribed subscriber stations. The OLT receives this multicast data in the form of a stream of multicast packets and replicates each of these multicast packets to create a copy for each ONT having a (CPE device that has joined the multicast group. The OLT then sends the copies of the same multicast packet to each of the respective ONTs. The ONTs, upon receiving the copy, send the copy of the packet to the corresponding one of the CPE devices, whereupon the CPE device consumes the multicast content.

SUMMARY

In general, the techniques described in this disclosure facilitate inline packet replication in computer networks. More specifically, the techniques of this disclosure may promote a more efficient form of integrated packet replication that does not require the assistance of an external network processor. Instead, packet replication performed in accordance with the techniques of this disclosure remains internal to a data path of the network devices, such as optical line terminals (OLTs), thereby potentially increasing packet throughput, particularly with respect to network traffic requiring packet replication for concurrent delivery of the same content to downstream devices, such as optical network terminals (ONTs). Moreover, the techniques of this disclosure may reduce the load on external processors that normally perform packet replication and reside in a control path of the network device. The reduced load may enable OLTs to feature less power intensive external processors that consume a reduced amount of board space, e.g., space on the physical board that hosts the external processor(s) and other components of the OLTs, and physical memory.

In one aspect, a method comprises receiving, with a optical line terminal (OLT) a data unit, wherein the OLT couples to one or more of optical network terminals (ONTs) via one or more different logical interfaces supported by a single physical interface, determining, with the OLT, whether the received data unit is a candidate for replication to create multiple copies of the data unit, performing, with an inline packet processing module located in a data path of the OLT, replication to generate at least one copy of the data unit based on the determination that the received packet is a candidate for packet replication and outputting, with the physical interface of the OLT, the at least one copy of the data unit to the one or more ONTs.

In another aspect, an optical line terminal coupled comprises a customer interface that supports one or more different logical interfaces to which couple a one or more optical network terminals (ONTs), a network interface that receives a data unit and a conversion unit located in a data path of the optical line terminal that determines whether the received data unit is a candidate for replication to create multiple copies of the data unit. The conversion unit includes an inline packet processing module that performs replication to generate at least one copy of the data unit based on the determination that the received packet is a candidate for packet replication. The customer interface outputs the at least one copy of the data unit to the one or more ONTs.

In another aspect, a network system comprises a public network, one or more optical network terminals (ONTs), a plurality of customer premises equipment coupled to the one or more ONTs, and an optical line terminal (OLT). The optical line terminal comprises a customer interface that supports one or more different logical interfaces to which the plurality of optical network terminals (ONTs) couple, a network interface that receives a data unit from the public network, and a conversion unit located in a data path of the optical line terminal that determines whether the received data unit is a candidate for replication to create multiple copies of the data unit. The conversion unit includes an inline packet processing module that performs replication to generate at least one copy of the data unit based on the determination that the received packet is a candidate for packet replication. The customer interface outputs the at least one copy of the data unit to the one or more ONTs.

In another aspect, a non-transitory computer-readable storage medium comprising instructions that cause a processor to receive, with a optical line terminal (OLT) a data unit, wherein the OLT couples to a plurality of optical network terminals (ONTs) via one or more different logical interfaces supported by a single physical interface, determine, with the OLT, whether the received data unit is a candidate for replication to create multiple copies of the data unit, perform, with an inline packet processing module located in a data path of the OLT, replication to generate at least one copy of the data unit based on the determination that the received packet is a candidate for packet replication, and output, with the physical interface of the OLT, the at least one copy of the data unit to the one or more ONTs.

In another aspect, an optical line terminal comprises means for receiving, with a optical line terminal (OLT) a data unit, wherein the OLT couples to a plurality of optical network terminals (ONTs) via one or more different logical interfaces supported by a single physical interface, means for determining, with the OLT, whether the received data unit is a candidate for replication to create multiple copies of the data unit, means for performing, with an inline packet processing module located in a data path of the OLT, replication to generate at least one copy of the data unit based on the determination that the received packet is a candidate for packet replication, and means for outputting, with the physical interface of the OLT, the at least one copy of the data unit to the one or more ONTs.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
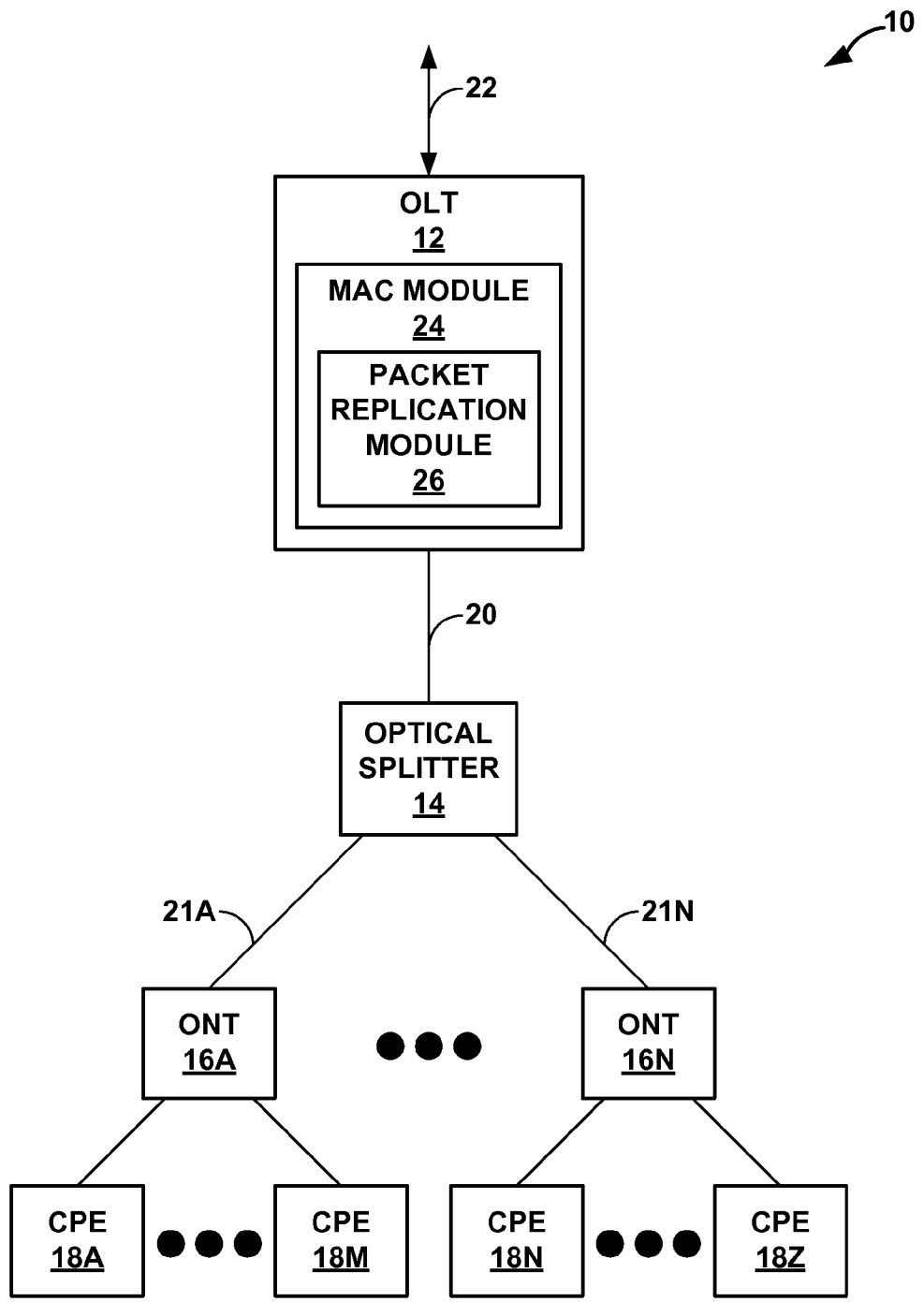
FIG. 1 is a block diagram illustrating a network system including an optical line terminal that implements the inline replication techniques described in this disclosure.

This disclosure is directed to techniques for performing inline packet replication in computer networks. The packet replication techniques of this disclosure provide for an implementation of an exemplary media access control (MAC) module that incorporates a packet replication module. The MAC module receives and processes data units referred to as Ethernet frames or packets and generally constitutes a portion of what is referred to as a "data path" of a network devices. The "data path" may refer to chain of circuitry that performs active processing and forwarding of data units, e.g., packets, in contrast to a so-called "control path" that is responsible for control functions or operations. Control path functionality may, for example, involve performing intrusion detection and prevention (IDP) operations, anti-virus operations, accounting and management operations, or any other operation not normally associated with the active processing and forwarding of packets, including path or address learning operations and configuration operations.

To illustrate the techniques in the context of an optical network, consider an optical network device referred to an optical line terminal (OLT) that couples to a number of optical network terminals (ONTs). The OLT includes a single physical interface that supports multiple logical interfaces. A single optical fiber line runs from the single physical interface to an optical splitter, which "splits" the optical signals from the line into separate paths. Each channel is relayed via a separate optical fiber line to a respective one of the ONTs. Each of the ONTs receives their respective channels and forward the data to customer premises equipment (CPE) devices coupled to the respective one of the ONTs via a subscriber network.

The OLT includes a MAC module that receives data packets from an upstream source, such as the Internet. The MAC module includes a packet replication module that implements the techniques of this disclosure to perform inline packet replication. The packet replication module first determines whether the received packet is a candidate for packet replication. Often, this determination involves identifying a virtual local area network (VLAN) to which the received packet is associated, where this VLAN is generally signaled as a VLAN tag added to a header of the received packet. In any event, based on this determination, the packet replication module performs packet replication to generate at least one copy of the received packet.

Assuming that received packet is determined to be a candidate for replication, the packet replication module performs packet replication to generate at least one copy of the received packet. The packet replication module may store data defining those of the logical interfaces (by which the ONTs couple to the OLT) that are members of the VLAN. For each identified member, the packet replication module generates a copy of the received packet and forwards the generated copy to the identified one of the ONTs. Notably, by performing this form of inline packet replication where replication is performed in the data path rather than being sent to an external processor (which is sometimes referred to as a network processor) that resides in the control path and outside of the data path, replication of those packets requiring replication may proceed with less latency compared to network devices that only employ external processors in the control path to perform packet replication in the control path.

In this manner, the techniques of this disclosure may promote a more efficient form of integrated packet replication that does not require the assistance of an external network processor, reduces latency and memory requirements. Instead, packet replication performed in accordance with the techniques of this disclosure remains internal to the data path of the network devices, such as optical line terminals (OLTs), thereby potentially increasing packet throughput, particularly with respect to network traffic requiring packet replication for concurrent delivery of the same content to downstream devices, such as optical network terminals (ONTs). Moreover, the techniques of this disclosure may reduce the load on external processors that reside external from the data path that normally perform packet replication. The reduced load may enable OLTs to feature less power intensive external processors that consume a reduced amount of so-called "board space," e.g., which is space on the physical board that hosts the external processors and other components of the OLTs, and physical memory.

FIG. 1 is a block diagram illustrating a network system 10 including an example of an optical line terminal 12 that implements the inline replication techniques described in this disclosure. While described in this disclosure with respect to an optical line terminal 12 ("OLT 12"), the techniques may be implemented by any type of network device capable of performing replication, such as a digital subscriber line access multiplexer (DSLAM), a cable modem termination system (CMTS), a switch, a hub, a router, and a server.

As shown in the example of FIG. 1, network system 10 includes OLT 12, an optical splitter 14, optical network terminals (ONTs) 16A-16N ("ONTs 16") and customer premises equipment (CPE) 18A-18Z ("CPE 18"). OLT 12 generally represents an optical network device that resides in a central office of a service provider and serves as a point of origination for fiber-to-the-premises (FTTP) transmissions. OLT 12 generally performs operations to maintain connectivity and schedule data transmissions between OLT 12 and ONTs 16. OLT 12 may, for example, perform auto-discovery to discover new ONTs 16, range ONTs 16 to adjust data transmissions to reduce conflicts, schedule upstream data transmission from ONTs 16 to OLT 12, and otherwise manage fiber line 20 coupling OLT 12 to each of ONTs 16.

Optical splitter 14 represents a device that splits, in some instances, an optical signal into two or more copies of the optical signal. In other instances, optical splitter 14 represents a device that splits an optical signal composed of a number of different wavelengths into at least two different optical signals that each has a different subset of the wavelengths. For purposes of illustration, optical splitter 14 is presumed to be a passive optical splitter that merely splits an optical signal into two or more copies or replicas of the optical signal. In effect, optical splitter 14 splits optical signals sent over optical line 20 into a number of different sub-signals so that these sub-signals can be sent via optical fiber lines 21A-21N ("optical fiber lines 21" or "optical lines 21"). OLT 12 generally includes one physical interface to service a number of ONTs, such as ONTs 16, where OLT 12 multiplexes a number of different optical signals of different wavelengths into a single optical signal that can be sent via the single physical interface to optical fiber line 20. Optical splitter 14, in this context, serves to split or copy the multiplexed optical signal and relay these various copies of the optical signals to each of ONTs 16. Optical splitter 14, while referred to as a splitter, may also include a combiner that combines the various optical signal sent upstream from ONTs 16 to OLTs 12 into a single optical signal.

Each of ONTs 16 represents an optical network device that terminates a corresponding one of optical fiber lines 21. ONTs 16 receive their corresponding optical signals and further demultiplex these signals into different component parts, such as a voice component, a video component and a data component. ONTs 16 then forward these different components via various subscriber networks (which, in this case, may include a voice, video and data network or some combination thereof) to CPE 18. CPE 18 each represents any device capable of receiving and processing the different components of the optical signal, such as a set-top box (STB), a digital recorder, a personal media player (PMP), a cellular phone (including so-called "smart phones"), a voice over Internet protocol (VoIP) telephone, an ordinary plain-old telephone system (POTS) phone, a television, a wireless network enabled television, a desktop computer, a laptop computer, a so-called "netbook," a personal digital assistant (PDA), a server, a workstation, a wireless access point (WAP), a hub, and a switch.

Unlike ordinary layer 2 (L2) or data link layer switches (where reference to layers refers to layers of the Open Systems Interconnection (OSI) model in this disclosure), OLT 12 generally does not include a separate physical interface for each logical path. Instead, OLT 12 maintains a single physical interface that supports a number of different logical interfaces, where each logical interface maps to a different logical path. Each logical interface supported by the single physical interface often maps to a different one of ONTs 16. OLT 12 generally receives packets via an upstream link 22, which usually couples OLT 12 to a public network such as the Internet, and then determines, for each of the received packets, one or more of the logical interfaces over which the received packets should be transmitted.

Commonly, OLT 12 determines the one or more logical interfaces based on one or more virtual local area network (VLAN) tags included in or appended to the packets. OLT 12 may be configured or provisioned such that each logical interface is mapped to one or more VLANs. More information regarding VLANs and the various operations associated with transmitting packets via a VLAN can be found in an Institute of Electrical and Electronics Engineers (IEEE) standard 802.1Q-1998, entitled "IEEE Standards for Local and Metropolitan Area Networks: Virtual Bridged Local Area Networks," approved Dec. 8, 1998, the entire contents of which are herein incorporated by references as if set forth in its entirety.

These VLANs may be carried over a service referred to commonly as a transparent local area network (TLAN) service. The TLAN service provides a form of enterprise connectivity by which to connect various enterprise networks owned usually by a single business or enterprise. The TLAN server enables a form of layer 2 (L2) or data link layer connectivity (where layers refer to layers of the Open Systems Interconnection (OSI) model) over a public network, such as the Internet. The connectivity offered by the TLAN service is "transparent" in the sense that the enterprise sites are unaware of or do not perform any special operations to interface with or otherwise communicate with one another over the TLAN service. The enterprise sites generally view each other as being directly connected by a LAN due to the emulated L2 connection emulated by the TLAN service.

In any event, OLT 12 may be provisioned to provide the TLAN service over which one or more VLANs may be configured to provide a form of targeted interconnectivity between the various enterprise sights. OLT 12 may receive a packet having a VLAN tag of "100," where OLT 12 has been provisioned in a manner such that a VLAN tag of 100 maps to a logical interface of "1." This mapping may be referred to as a one-to-one (1:1) mapping in that this VLAN tag maps to a single logical interface that is mapped to a single logical path that ONT 16A terminates. In contrast, OLT 12 may receive a packet having a VLAN tag of "200," which OLT 12 has been provisioned in a manner such that a VLAN tag of 200 maps to logical interfaces "1," "2," and "3." This mapping may be referred to as a one-to-many (1:N) mapping in that this VLAN tag maps to multiple logical interfaces that are each mapped to a different logical path that each of ONTs 16A, 16B and 16C terminate. The one-to-one mapping facilitates the delivery of unicast traffic, while the one-to-many mapping facilitates the delivery of multicast, and to a certain extent, broadcast traffic. In some instances, if a given VLAN tag is not "known" in the sense that OLT 12 does not include a mapping for this particular VLAN tag, OLT 12 may drop this packet.

As shown in the example of FIG. 1, OLT 12 includes a media access control (MAC) module 24 ("MAC module 24") that represents a hardware module, which in some instances executes software, responsible for control of the data link layer or layer 2 transmissions via optical fiber line 20. MAC module 24 generally stores the data to maintain the above mappings, as well as, provide the necessary switching functionality for delivery of packets received via upstream link 22 to optical fiber line 20, optical fiber line 20 to upstream link 22, and optical fiber line 20 to optical fiber line 20 (as in instances where ONTs 16 communicate with one another).

Considering that MAC module 24 handles the delivery and receipt of data traffic, MAC module 24 lies in what is commonly referred to as a "data path" of OLT 12, where the term "data path" refers to a path through OLT 12 responsible for handling or processing of data packets. The control path, in contrast to the data path, of OLT 12 is generally responsible for control functions, such as providing an interface by which the data path may be provisioned, configured and/or administered, as well as, maintaining control protocols responsible for provisioning the data path or otherwise facilitating the maintenance of network system 10. Control path functions may also include ranging, auto discovery and other control operations.

By convention, layer 2 (L2) devices, such as OLT 12, only provide for a specific number of queues for each physical interface, where each queue may provide for a different quality of service (QoS) or forwarding priority so that different classes of traffic may be scheduled for delivery downstream in a manner that meets that traffics specifications in terms of tolerance of latency. MAC module 24 generally includes these queues and uses these queues to schedule delivery of packets received via upstream link 22 and optical fiber line 20. For one-to-one mappings, MAC module 24 generally stores packets from the network interface that couples to upstream link 22 to one of the queues that service a downstream customer interface that couples to downstream optical fiber line 20. However, for one-to-many mappings, issues may arise because one-to-many mappings generally require a given packet to be replicated or copied and placed in the appropriate queue with the correct VLAN tag, for example, to accurately emulate a LAN so as to provide a TLAN service.

To illustrate these issues, consider first a L2 switch in a standard LAN that provides a separate physical interface for each logical path, where each separate physical interface is serviced by its own set of queues. The MAC in these L2 switches generally offloads packets identified as corresponding to one-to-many mappings to a control path processor often referred to as a network processor. The network processor, in these devices, replicates the offloaded packet and stores a copy of the packet in each of the set of queues that correspond to a physical interface that have been provisioned as belonging to the one-to-many VLAN. In the context of an OLT, such as OLT 12, however, MAC module 24 ordinarily only provides a single set of queues that service the customer interface rather than provide a set of queues for each logical interface supported by the downstream physical interface. Consequently, issues arise with respect to one-to-many mappings that are generally candidates for replication to accurately, as one example, emulate a LAN to provide the TLAN service in that OLT 12 does not feature the conventional set of queues that are mapped to each logical path.

In accordance with the inline replication techniques of this disclosure, MAC module 24 includes a packet replication module 26 integrated within the data path of OTL 12. Packet replication module 26 represents a hardware module, which in some instances executes software, to perform the inline packet replication techniques described in this disclosure. MAC module 24, upon receiving a given packet from either upstream link 22 or optical fiber line 20, performs ingress processing to initially determine whether a VLAN tag assigned to the packet corresponds to a one-to-one VLAN or a one-to-many VLAN. In this sense, MAC module 24 determines whether the received packet is a candidate for replication to create multiple copies of the packet. Assuming this packet includes a VLAN tag that corresponds with a one-to-many VLAN for purposes of illustration and therefore is a candidate for replication, MAC module 24 invokes packet replication module 26 to perform the inline packet replication techniques described in this disclosure rather than forward this packet to an external control unit, such as a network processor that resides in a control path of OLT 12.

In response to receiving this packet, packet replication module 26 performs packet replication to generate at least one copy of the data unit based on the determination that the received packet is a candidate for packet replication. In some instances, packet replication module 26 may, prior to performing packet replication, qualify the packet for packet replication by applying one or more replication rules. These replication rules may be provisioned or configured by a system administrator (which is often referred to as an "admin") or may, alternatively, come pre-configured. These rules provide the admin with more granular control over packet replication. For example, an admin may specify a rule that requires all broadcast packets that have a one-to-many VLAN type to be replicated. Alternatively, an admin may specify a different rule that qualifies packet replication based on a destination MAC address lookup so as to determine to which of ONTs 16 to send the packet.

To improve the speed with which replication can be performed, which is often crucial for data path operations as these operations generally attempt to proceed at so-called "line speed" (i.e., the rate at which data can be sent via optical fiber line 20 or upstream link 22 in this example), packet replication module 26 may be implemented as a programmable hardware unit such as a field programmable gate array (FPGA) or an application specific integrated circuit (ASIC). In this hardware context, packet replication module 26 may perform packet replication by storing what is referred to as a replication table that identifies for each one-to-many VLANs those of the logical interface (by which ONTs 16 couple to the OLT) that are members of the corresponding one-to-many VLANs. Packet replication module 26 processes a given packet in hardware by performing a lookup in this replication table based on a replication engine number assigned to the packet when initially processed during ingress processing. Packet replication module 26 extracts an entry referred to as a "replication engine" from this replication table that corresponds to the replication engine number assigned to the packet. This entry or replication engine may comprise a bitmap identifying with a set bit or a bit set to "1" those of the logical interfaces (by which ONTs 16 couple to the OLT) that are members of the one-to-many VLAN. Packet replication module 26 traverses this bitmap bit-by-bit, generating a copy of the packet for each set bit in the bitmap. Packet replication module 26 then forwards each of the copies to the appropriate ones of the logical interfaces, which forward the copies to ONTs 16.

In this manner, OLT 12 may perform the inline packet replication techniques described in this disclosure to promote more efficient packet replication. Notably, the techniques of this disclosure may enable OLT 12 to scale packet replication in a manner that better accommodates the growth of services that typically require extensive packet replication, such as transparent local area networks (TLANs). The techniques may scale better in comparison to conventional control path packet replication techniques because the techniques may be integrated within the hardware of the data path, thereby decreasing latency that normally limits the scale with which packet replication is performed. Moreover, hardware implementations of the inline packet replication techniques are more efficient in terms of packet replication throughput than control path implementations that often general purpose network processors that execute cumbersome and generally inefficient software routines to perform packet replication. Consequently, the techniques of this disclosure, in addition to promoting power conservation and more compact implementations in terms of board space and physical memory, may also improve scalability with respect to packet replication throughput.

While described in this disclosure with respect to passive optical networks (PONs), the techniques described in this disclosure may be implemented with respect to any type of optical network, such as a broadband PON (BPON), a gigabyte PON (GPON), an Active Ethernet (AE) network, an Ethernet PON (EPON), and the like. In examples where optical transport system 10B is a PON, optical transport system 10B may function in accordance with the giga-bit PON (GPON), baseband PON (BPON), or Ethernet PON (EPON) standards, or other standards. The GPON, BPON, and EPON standards are defined by ITU-T G984.2 and G983.3, ITU-T 983.1, and IEEE 802.3ah, respectively. As one example, optical transport system 10A may be an Active Ethernet (AE) system and may function in accordance with the AE standard. The AE standard is defined by IEEE 802.3ah. Therefore, the techniques described in this disclosure should not be limited in this respect to a PON.

Figure 2:
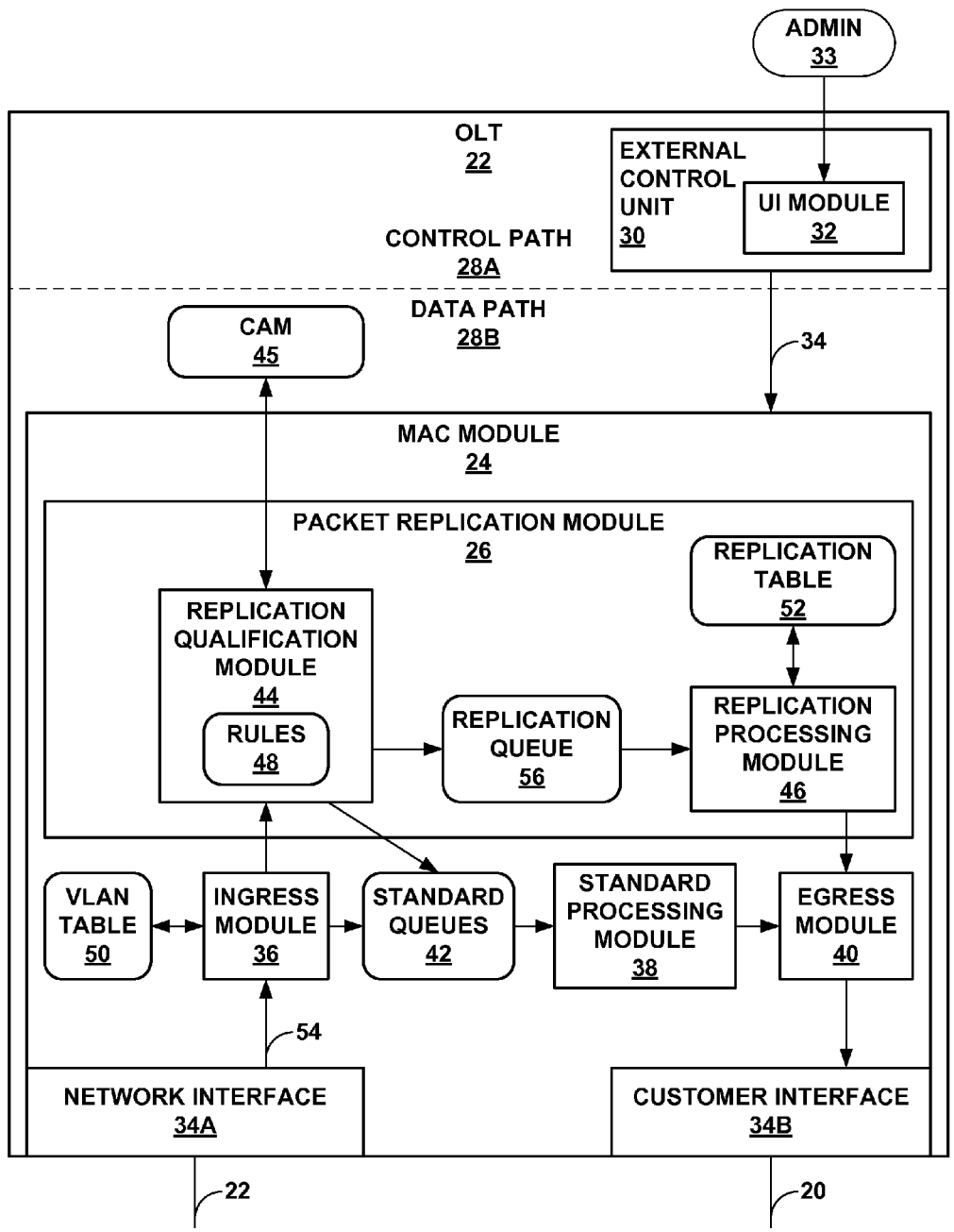
FIG. 2 is a block diagram illustrating the OLT shown in the example of FIG. 1 in more detail.

FIG. 2 is a block diagram illustrating OLT 12 of FIG. 1 in more detail. As shown in the example of FIG. 2, OLT 12 is divided into two logical paths, a control path 28A and a data path 28B. Control path 28A includes an external control unit 30, which may represent a network processor or some other processor or hardware logic that executes software to perform the particular control functions noted above. External control unit 30 includes a user interface (UI) module 32 that represents a hardware module that executes software to present one or more user interfaces with which a user, such as admin 33, may interface to specify configuration data 34.

Data path 28B includes MAC module 24, which represents one example of a conversion unit or GPON conversion unit in the instance of a GPON. MAC module 24 includes network interface 34A and customer interface 34B. Network interface 34A represents a hardware module that presents a physical interface for coupling to upstream link 22. Customer interface 34B represents a hardware module that presents a physical interface for coupling to downstream fiber optic line 20. Each of interfaces 34A, 34B ("interfaces 34") may support one or more logical interfaces, where a logical interface refers to an interface for a virtual network, such as a VLAN.

MAC module 24 includes packet replication module 24, as shown in the example of FIG. 1, but also may include an ingress module 36, a standard processing module 38 and an egress module 40. Ingress module 36 represents a hardware module, which in some instances executes software, to generally admit packets received from network interface 34A to either so-called "standard processing" or "replication processing." The phrase "standard processing" refers to normal MAC processing of unicast packets, while the phrase "replication processing" refers to the inline packet replication techniques described in this disclosure that is employed with respect to multicast, anycast and broadcast packets. Standard processing module 38 represents a hardware module, which in some instances executes software, to implement the standard processing. Standard processing module 38 may, for example, determine a quality of service assigned to a given unicast packet and process this packet by placing this packet in a corresponding one of standard processing queues 42 assigned the same quality of service. Egress module 40 represents a hardware module, which in some instances executes software, to multiplex packets received from packet replication module 26 and standard processing module 38 for delivery by customer interface 34B via downstream fiber optic line 20 to ONTs 16.

As shown further in the example of FIG. 2, packet replication module 26 includes a replication qualification module 44 and a replication processing module 46. Replication qualification module 44 represents a hardware module, which in some instances executes software, to qualify those packets admitted to replication processing through application of one or more rules 48 to a given packet admitted to replication processing. Packet qualification module 44 generally stores rules 48 in a memory and applies rules 48 to provide more granular control over replication processing. Rules 48 may be hardcoded within packet qualification module 44 or configured in a memory or storage device of packet qualification module 44. Replication processing module 46 generally represents a hardware module, which in some instances executes hardware, to accurately replicate one or more qualified packets admitted to replication processing.

Initially, admin 33 interfaces with a user interface presented by UI module 32 to define configuration data 34. Configuration data 34 may specify one or more of rules 48, as well as, define entries of a VLAN table 50 used by ingress module 36 during the admission process and a replication table 52 referenced by replication processing module 46. In some instances, rules 48 may come pre-configured as a default rule set. VLAN table 50 generally includes an entry for each VLAN provisioned in network system 10. Configuration data 34 may identify whether a corresponding VLAN represents a one-to-one VLAN or a one-to-many VLAN. Each entry of VLAN table 50 may include this one-to-one or one-to-many designation, as well as, various VLAN parameters.

The following Table 1 sets out one example portion of VLAN table 50, where the one-to-one or one-to-many designation is referred to as a scope of the VLAN.

TABLE 1

| VLAN (Tag) | Scope |
|---|---|
| 100 | 1:1 |
| 200 | 1:1 |
| 300 | 1:N |

In the example Table 1 above, the VLANs identified by VLAN tags of 100, 200 are designated as having scope of 1:1, while the VLAN identified by a VLAN tag of 300 is designated as having a scope of 1:N. While shown as an incomplete portion of VLAN table 50 in the example of Table 1 for ease of illustration purposes, VLAN table 50 may also store data related to an action type, a multicast port identifier (MC PID), a replication engine index, one or more flags and a service tag.

The action type data may indicate one of two actions with regard to adding or removing an outermost VLAN tag. This action type data may also be used by external networks to identify the network interface of this OLT port. The MC PID data specifies which multicast PID to be used. This data is only valid or available to be considered when the "process multicast" flag is set in the flags data. The MC PID data allows multicast to be send down a single PID without requiring any replication. The ONTs can then be configured to only listen to certain multicast PIDs. The replication index data maps into the 32-bit entry replication table for packet replication. The flags data is used to indicate bridging behavior on a per VLAN basis, where a value of 0x01 indicates that multicast packets are sent down a special PID identified by the MC PID field, 0x02 indicates that downstream flooding is allowed such that multicast and/or broadcast packets are replicated/flooded downstream, 0x04 indicates that upstream learning is enabled such that GPON MAC will learn this VLAN and 0x08 indicates that DHCP snooping is enabled such that the GPON MAC traps upstream DHCP packets on this VLAN to the CPU. The service tag (S-tag) data identifies a VLAN tag value to be added to the packet, which is used when the action type data identifies an action is required.

Replication table 52 may include an entry for each logical interface (which is also often referred to as a "logical port") supported by customer interface 34B, where it is typical for a common customer interface 34B to support approximately 4096 logical ports. Each of these entries includes a bitmap having a bit for each of the logical ports. In this example, each bitmap includes 4096 bits. A set bit in the bitmap, i.e., a bit in the bitmap set to a value of one in this example, indicates that the logical port or interface is participating in a given multicast group or broadcast event, while an unset bit in the bitmap, i.e., a bit in the bitmap set to a value of zero in this example, indicates that the corresponding logical port or interface is not participating in the given multicast group or broadcast event. Generally, a given physical interface supports up to 64 ONTs, and under this exemplary assumption, replication table 52 may comprise approximately 32 entries (as at least two ONTs are required to be members of a 1:N-type VLAN).

The following Table 2 sets out one example of replication table 52.

TABLE 2

| Replication Engine (VLAN Tag) | Bit 0 | *** | Bit 4095 |
|---|---|---|---|
| 300 | 1 | | 0 |

In the example Table 2 above, only one entry exists as only one VLAN with a VLAN tag value of 300 has been provisioned as a one-to-many VLAN. In any event, each one-to-many VLAN corresponds to a so-called "replication engine" entry in replication table 52. The VLAN tag value is used as an index into replication table 52 to identify the corresponding replication engine, which as shown in the example of Table 2 is associated to the VLAN tag values. Each replication engine maps to a bitmap, which in the example of Table 2 is illustrated by the second through 4096th column. For the VLAN identified by the VLAN tag value of 300, the corresponding bitmap indicates that bit zero of the bitmap is set to one, while bit 4095 is set to zero.

While shown above as including a replication engine column in the example Table 2, replication table 52 may generally store only the bitmaps which are accessible in any conventional manner. That is, replication table 52 may not explicitly store the replication engine but only the bitmap, where the replication engine is an input into an indexing function to locate the corresponding bitmap. Replication table 52 should therefore not be limited to the example shown above with respect to Table 2.

After configuring rules 48, VLAN table 50, and replication table 52, admin 33 may enable OLT 12 such that OLT 12 begins to receive and transmit network traffic. To illustrate the techniques of this disclosure, consider that network interface 34A receives a packet 54 and forwards packet 54 to ingress module 36. Ingress module 36 determines whether packet 54 is a candidate for replication by extracting a VLAN tag from a header of packet 54 and performing a lookup in VLAN table 50 using the extracted VLAN tag as an index.

Assuming for purposes of illustration that the extracted VLAN tag has a value of 300, ingress module 36 extracts the third entry from the example VLAN table 50 shown above with respect to Table 1 and references the scope column of this entry. Considering that the indicated scope is 1:N, ingress module 36 determines that packet 54 is a candidate for replication or replication candidate. Based on this determination ingress module 36 forwards packet 54 to replication qualification module 44 of packet replication module 26. Replication qualification module 44 applies one or more of rules 48 to packet 54, where these rules 48 may cause replication qualification module 44 to parse various aspects of both the header and payload of packet 54 and evaluate the parsed aspects to perform one or more operations.

For example, replication qualification module 44 may apply one of rules 48 that requires replication qualification module 44 to parse a destination MAC address from packet 54 and determine whether, based on the parsed destination MAC address, packet 54 is a candidate for replication. If not a replication candidate, replication qualification module 44 typically forwards packet 54 back to the standard processing path by storing packet 54 to one of standard queues 42. However, if packet 54 is determined to be a replication candidate, replication qualification module 44 effectively qualifies packet 54 for replication processing. In some instances, replication qualification module 44 may provide an interface by which to access a content addressable memory 45 ("CAM 45"), which replication qualification module 44 may access to, for example, handle the destination MAC lookups to determine to which of ONTs 16 to sent packet 54. CAM 45 represents one example of a layer 2 lookup table that may provide L2 learning for emulating a L2 switch within OLT 12. CAM 45, while shown external from MAC module 24, may be integrated within MAC module 24.

Assuming packet 54 is qualified for replication processing, replication qualification module 44 may store packet 54 to the bottom of replication queue 56, which is generally referred to as "pushing" packet 54 onto queue 56. Replication processing module 46 meanwhile removes packets from the top of replication queue 56, which is generally referred to as "popping" packets from queue 56. Replication processing module 46, at some point, pops packet 54 from replication queue 56 and extracts the VLAN tag from the header of packet 54. Using this VLAN tag as an index into replication table 52, replication processing module 46 references the first entry or so-called "replication engine" of replication table 52 shown in the example Table 2 above considering that the extracted VLAN tag has a value of 300. Replication processing module 46 traverses the bitmap associated with the determined entry bit-by-bit, creating a copy of packet 54 for each set bit and associating the copy of the packet 54 with the corresponding logical port or interface identifier (e.g., the Port ID associated with the logical path). For each unset bit, replication processing module 46 does not create a copy of packet 54, but traverses to the next bit in the bitmap.

In some instances, the VLAN tag is not used to access the replication engine. In these instances, reference to the replication engine is stored along with the packet in the queue. Replication processing module 46 retrieves the reference to the replication engine when retrieving the packet and uses this reference (which may be referred to as a "replication engine identifier") as an index into replication table 52. Accordingly, the techniques described in this disclosure should not be limited in this respect.

In some examples, replication processing module 46 may process one bit per each clock cycle or may process multiple bits per each clock cycle to effectively optimize replication processing. For example, if replication table 52 is organized as a 32-bit wise table rather than a single-bit wide table, replication processing module 46 can retrieve 32-bits of the bitmap per clock cycle and effectively process in parallel each of the 32 bits during a single clock cycle in comparison to the single bit processing enables by a single-bit wise organized replication table.

In any event, as each copy is generated, replication processing module 46 forwards these copies of packet 54 to egress module 40, which multiplexes these copies of packet 54 with packets that are subjected to standard processing. That is, ingress module 36 may directly admit some packets, e.g., those identified as corresponding to a VLAN with a scope of 1:1, directly to standard processing by storing these packets to one of standard queues 42. Alternatively, replication qualification module 44 may not qualify some packets for replication processing and, as a result, move these packets back to the standard processing path by storing these packets to one of standard queues 42. Standard processing module 38 may pop packets from standard queues 42 perform the above noted standard processing and forward these packets to egress module 40, which as noted above multiplexes these packets with those received from replication processing module 46 for delivery via customer interface 34B via downstream fiber optic line 20.

In this manner, MAC module 24 implements the inline packet processing techniques in the form of an integrated packet replication module 26 to avoid offloading packets that are candidates for replication out of data path 28B to external control unit 30. As a result, the techniques may improve latency with respect to the servicing of packets requiring replication while also reducing the load on external control unit 30. As packet replication module 26 may be implemented as a dedicated hardware module that typically requires little if any software, the techniques may promote more efficient replication processing when compared to a general purpose processor, such as a network processor, that executes software to perform replication processing. This efficiency may effectively enable better scaling to handle increased replication processing as services, such as TLANs, gain traction and acceptance.

Figure 3:
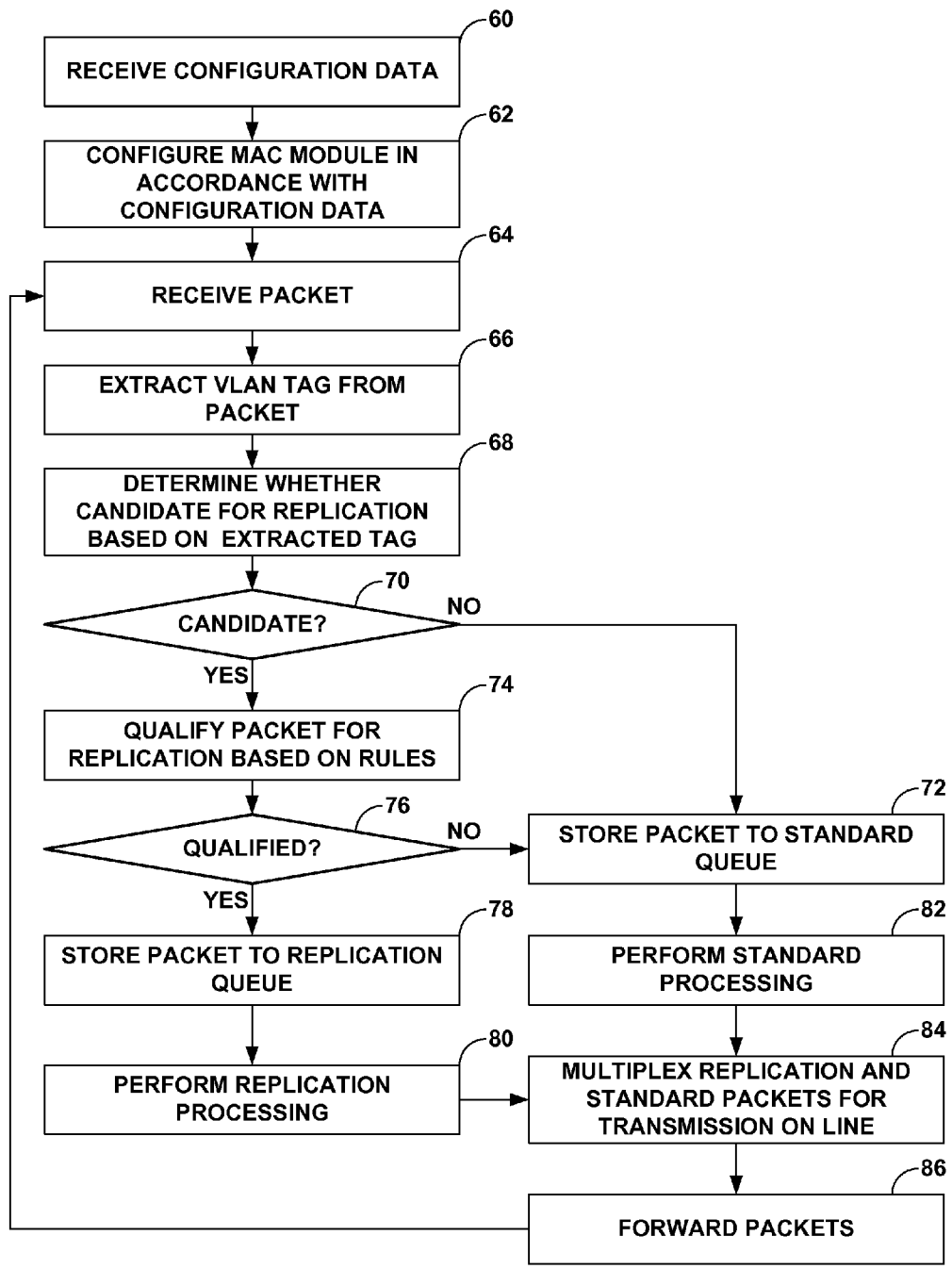
FIG. 3 is a flowchart illustrating example operation of a network device in implementing the inline packet replication techniques described in this disclosure.

FIG. 3 is a flowchart illustrating example operation of a network device, such as OLT 12 shown in the example of FIG. 2, in implementing the inline packet replication techniques described in this disclosure. Initially, a user, such as admin 33 interfaces with a user interface presented by UI module 32 to input configuration data 34, which UI module 32 receives and uses to configure MAC module 24 (such as rules 48, VLAN table 50 and replication table 52) in the manner described above (60, 62). Admin 33 then enables OLT 12 to being receiving and transmitting packets, whereupon network interface 34A receives a packet 54 (64). Network interface 34A forwards packet 54 to ingress module 36.

Upon receiving packet 54, ingress module 36 extracts a VLAN tag stored to a header of packet 36 and determines whether the packet is a candidate for replication based on the extracted VLAN tag, as described above (66, 68). Generally, ingress module 36 uses the extracted VLAN tag as an index into VLAN table 50 to access an entry that indicates whether packet 54 is a candidate for replication. If packet 54 is not a candidate for replication ("NO" 70), ingress module 36 stores packet 54 to one of standard queues 42 (72). If packet 54 is a candidate for replication ("YES" 70), ingress module 36 forwards packet 54 to replication qualification module 44 of packet replication module 26. Replication qualification module 44 qualifies packet 54 for replication based on rules 48, as described above (74). If packet 54 is not qualified ("NO" 76), replication qualification module 44 returns packet 54 to the standard processing path by storing packet 54 to one of standard queues 42 (72). If packet 54 is qualified ("YES" 76), replication qualification module 44 stores packet 54 to replication queue 56 (78).

Assuming packet 54 is determined to be a replication candidate and is qualified, replication processing module 46 pops packet 54 from replication queue 56 and performs replication processing with reference to replication table 52 in the manner described above (80). Alternatively, assuming packet 54 either is not a candidate for replication or is a candidate for replication but is not qualified for replication, standard processing module 38 pops packet 54 from one of standard queues 42 and performs standard processing, as described above (82). In any event, egress module 40 receives packet 54 from either replication processing module 46 or standard processing module 38 and multiplexes this packet 54 with the other packets received from either standard processing module 38 or replication processing module 46, respectively (84). Egress module 40 then forwards these multiplexed packets via customer interface 34B to one or more of ONTs 16 (86). OLT 12 may continue in this manner to receive, processes and forward packets (64-86).

Figure 4:
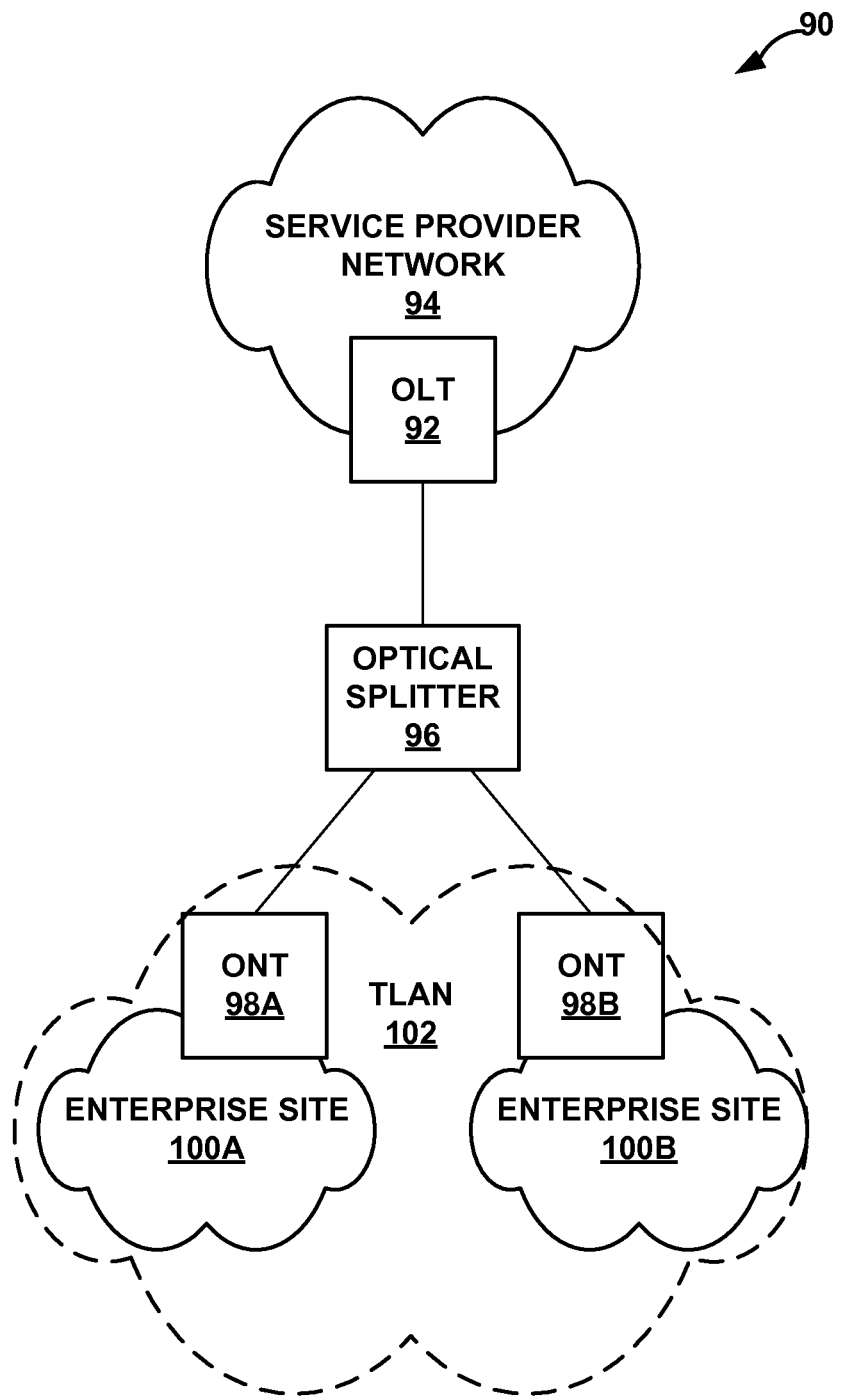
FIG. 4 is a block diagram illustrating another exemplary optical network system including an OLT that implements the techniques described in this disclosure in the context of a transparent local area network service.

FIG. 4 is a block diagram illustrating another exemplary optical network system 90 including an OLT 92 that implements the techniques described in this disclosure in the context of a transparent local area network service. As shown in the example of FIG. 4, optical network system 90 includes a service provider network 94, an optical splitter 96 that is substantially similar to optical splitter 14 shown in the example of FIG. 1, ONTs 98A and 98B ("ONTs 98"), and enterprise sites 100A and 100B ("enterprise sites 100"). OLT 92 may be substantially similar to OLT 12 shown in the example of FIGS. 1 and 2. ONTs 98 may be substantially similar to ONT 16 shown in the example of FIG. 1.

Service provider network 94 may represent a public network owned and operated by a service provider that provides data connectivity services. Service provider network 94 generally couples to and provides access to the Internet in the form of the various data connectivity services. One connectivity service includes a transparent local area network (TLAN) service that enables the above described form of L2 interconnectivity between at least two different enterprise sites, such as enterprise sites 100. Enterprise sites 100 generally represent a site owned and operated by a single enterprise. For example, a large enterprise may provide a campus of buildings to house its operations, where each building represents one of enterprise sites 100. To interconnect these enterprise sites 100, the enterprise may contract with the service provider to provide the TLAN service to transparently interconnect enterprise sites 100 from the L2 perspective. Enterprise sites 100 may include CPE, such as CPE 18. The service provider then provisions OLT 92 to provide the TLAN service, which forms what is shown in the example of FIG. 4 as "TLAN 102."

TLAN 102 may represent the virtual or transparent LAN formed between enterprise sites 100 through OLT 92 providing the TLAN service. From the perspective of enterprise sites 100, each of enterprise sites 100 communicate and otherwise interface with each other as if each of enterprise sites 100 were directly connected to one another via a dedicated physical link. OLT 92, from the perspective of enterprise networks 100, is viewed as a L2 switch given the accurate emulation of LAN replication enabled through implementing the inline packet replication techniques described in this disclosure.

OLT 92 implements the techniques described above with respect to OLT 12 to perform the inline packet replication. In some instances, ONT 98A may forward a packet originating from enterprise site 100A to OLT 92, which implements the techniques to replicate this packet for delivery via one or more of the logical interfaces coupled to logical paths that are terminated by ONT 98B. Moreover, OLT 92 may replicate this packet and forward the replicated packet to other logical interfaces (excluding the logical interface over which the packet was originally received) connected to logical paths terminated by ONT 98A. This form of packet forwarding is often not employed with respect to residential customers as different customers generally desire privacy with respect to their data services. However, in the context of the enterprise L2 network, this form of replication is often necessary to accurately represent a L2 network, such as an Ethernet network. Moreover, privacy is not usually a concern in these networks. Such forwarding is often referred to as "hairpin" forwarding because the traffic enters any given customer or subscriber interface and is forwarded out the same customer or subscriber interface, where the path of this forwarding resembles that of a hairpin.

To illustrate this type of "hairpin" forwarding or replication, consider that OLT 92 is substantially similar to OLT 12 shown in the example of FIG. 2. Assuming a packet is received via one of a number of logical interfaces supported by customer interface 34B, ingress module 36 processes this packet in the manner described above and determines that this packet is a candidate for replication. Based on this determination, ingress module 36 forwards this packet to replication qualification module 44, which applies rules 48 again in the manner described above. Assuming the packet is successfully qualified, replication qualification module 44 stores this qualified packet to replication queue 56, where replication processing module 46 eventually pops this packet. Replication processing module 46 performs a lookup in replication table 52 in the manner described above to determine one or more logical interfaces to which this packet should be sent. In the example of hairpin multicasting or forwarding, one or more of these determined logical interfaces are also supported by the same physical interface, i.e., customer interface 34B in this example. Replication processing module 46 generates copies for these logical interfaces and forwards the packet to egress module 40 which in turn forwards these copies out of the same physical interface, i.e., customer interface 34B in this example, over which the original packet was received. Consequently, the packet appears to go up to packet replication module 26 from customer interface 34B and back down to customer interface 34B in a path that resembles a hairpin.

The techniques described herein may be implemented in hardware, firmware, or any combination thereof. The hardware may, in some instances, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. Considering the non-transitory nature of these exemplary storage mediums, the computer-readable storage medium may be considered a non-transitory computer-readable storage medium in some instances. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discreet logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples of the disclosure have been described. These and other examples are within the scope of the following claims.

The invention claimed is:

1. A method comprising:
receiving, with an optical line terminal (OLT), a data unit, wherein the OLT couples to one or more optical network terminals (ONTs) via one or more different logical interfaces supported by a single physical interface,
determining, with the OLT, whether the received data unit is a candidate for replication to create multiple copies of the data unit;
performing, with an inline packet processing module located in a data path of the OLT, replication to generate at least one copy of the data unit based on the determination that the received packet is a candidate for packet replication; and
outputting, with the physical interface of the OLT, the at least one copy of the data unit to the one or more ONTs.

2. The method of claim 1,
wherein receiving a data unit includes receiving a data unit that includes a header specifying a virtual local area network (VLAN) tag, and
wherein determining whether the received data unit is a candidate for replication includes determining whether the received data unit is a candidate for replication based on the VLAN tag specified in the header of the data unit.

3. The method of claim 2, further comprising:
presenting an interface to receive configuration data for provisioning an entry of a VLAN table that corresponds to a VLAN identified by the VLAN tag, wherein the configuration data includes scope data indicating whether a scope of the VLAN is one-to-one or one-to-many; and
extracting the VLAN tag from the header of the data unit, wherein determining whether the received data unit is a candidate for packet replication includes:
accessing the VLAN table using the extracted VLAN tag as an index into the table to retrieve the entry from the VLAN table that corresponds to the VLAN identified by the VLAN tag,
parsing the retrieved entry to extract the scope data indicating the scope of the VLAN identified by the VLAN tag, and
when the parsed scope data indicates that the scope of the VLAN identified by the VLAN tag is one-to-many, determining that the received data unit is a candidate for replication.

4. The method of claim 1, further comprising, upon the determination that the received data unit is a candidate for replication, applying one or more rules to the received data unit to qualify the received data unit for replication,
  wherein performing replication includes performing replication to generate at least one copy of the data unit based on the determination that the received packet is a candidate for replication and is qualified for replication.

5. The method of claim 4, wherein applying the one or more rules includes accessing a content addressable memory to qualify the received data unit for replication.

6. The method of claim 4, further comprising presenting an interface to receive configuration data that defines the one or more rules applied to the received data unit to qualify the received data unit for replication.

7. The method of claim 1, wherein receiving a data unit includes receiving a data unit that includes a header specifying a virtual local area network (VLAN) tag, and
  the method further comprises:
    presenting an interface to receive configuration data for provisioning an entry of a replication table that corresponds to a VLAN having a scope of one-to-many identified by the VLAN tag, wherein the configuration data indicates those of the one or more logical interfaces that are members of the VLAN having a scope of one-to-many; and
    storing the entry to the replication table as a replication engine that is associated with the VLAN tag and defines a bitmap, wherein each bit of the bitmap is associated with a logical interface and indicates whether the corresponding logical interface couples to one of the ONTs that are members of the VLAN having the scope of one-to-many,
  wherein performing replication includes:
  parsing the VLAN tag from the header of the data unit;
  accessing the replication table using the VLAN tag as an index to retrieve the replication engine of the replication table associated with the VLAN tag;
  parsing the retrieved replication engine to extract the bitmap; and
  generating a copy for each bit of the bitmap indicating that the corresponding logical interface that are members of the VLAN having the scope of one-to-many.

8. The method of claim 1, wherein one of the one or more ONTs provides connectivity to the OLT for at least one enterprise site operated by an enterprise,
  wherein the OLT provides a transparent local area network (TLAN) service that enables a transparent form of layer 2 (L2) interconnectivity between the at least one enterprise site and another enterprise site operated by the same enterprise such that the at least one enterprise site and the other enterprise site appear directly interconnected to one another,
  wherein receiving a data unit comprises receiving, with the OLT, the data unit from the one of the one or more ONTs providing connectivity to the OLT for the at least one enterprise site via one of the plurality of logical interfaces supported by the single physical interface,
  wherein outputting the at least one copy of the packet comprises outputting the at least one copy of the data unit back to the one of the one or more ONTs that provides connectivity to the OLT for the at least one enterprise site via at least one of the remaining plurality of logical interfaces different from the one of the logical interface from which the data unit was originally received.

9. The method of claim 1,
  wherein the one or more different logical interface supported by the single physical interface comprises a first logical interface,
  wherein receiving the data unit comprises receiving the data unit via the first logical interface,
  wherein determining whether the received data unit is a candidate for replication comprises determining whether the received data unit is a candidate for hairpin replication, and
  wherein outputting the at least one copy of the data unit to the one or more ONTs comprises, in response to the determination that the received data unit is a candidate for hairpin replication, outputting the at least one copy of the data unit to the one or more ONTs via the one or more different logical interfaces except the first logical interface.

10. An optical line terminal coupled comprising:
  a customer interface that supports one or more different logical interfaces to which couple one or more optical network terminals (ONTs);
  a network interface that receives a data unit; and
  a conversion unit located in a data path of the optical line terminal that determines whether the received data unit is a candidate for replication to create multiple copies of the data unit,
  wherein the conversion unit includes an inline packet processing module that performs replication to generate at least one copy of the data unit based on the determination that the received packet is a candidate for packet replication, and
  wherein the customer interface outputs the at least one copy of the data unit to the one or more ONTs.

11. The optical line terminal of claim 10,
  wherein the network interface receives a data unit that includes a header specifying a virtual local area network (VLAN) tag, and
  wherein the conversion unit includes a media access control (MAC) module that determines whether the received data unit is a candidate for replication based on the VLAN tag specified in the header of the data unit.

12. The optical line terminal of claim 11, further comprising a control path that includes an external network process having a user interface module that presents an interface to receive configuration data for provisioning an entry of a VLAN table that corresponds to a VLAN identified by the VLAN tag, wherein the configuration data includes scope data indicating whether a scope of the VLAN is one-to-one or one-to-many,
  wherein the media access control (MAC) module that extracts the VLAN tag from the header of the data unit and accesses the VLAN table using the extracted VLAN tag as an index into the table to retrieve the entry from the VLAN table that corresponds to the VLAN identified by the VLAN tag, parses the retrieved entry to extract the scope data indicating the scope of the VLAN identified by the VLAN tag, and when the parsed scope data indicates that the scope of the VLAN identified by the VLAN tag is one-to-many, determining that the received data unit is a candidate for replication.

13. The optical line terminal of claim 10, wherein the inline packet processing module, upon the determination that the received data unit is a candidate for replication, applies one or more rules to the received data unit to qualify the received data unit for replication, and performs replication to generate at least one copy of the data unit based on the determination that the received packet is a candidate for replication and is qualified for replication.

14. The optical line terminal of claim 13, wherein the inline packet processing module accesses a content addressable memory to qualify the received data unit for replication.

15. The optical line terminal of claim 13, further comprising a control path that includes an external network processor having a user interface module that presents an interface to receive configuration data that defines the one or more rules applied to the received data unit to qualify the received data unit for replication.

16. The optical line terminal of claim 10,
wherein the network interface receives a data unit that includes a header specifying a virtual local area network (VLAN) tag, and
wherein the optical line terminal includes a control path comprising an external network processor having a user interface that presents an interface to receive configuration data for provisioning an entry of a replication table that corresponds to a VLAN having a scope of one-to-many identified by the VLAN tag, wherein the configuration data indicates those of the one or more of the logical interfaces that are members of the VLAN having a scope of one-to-many,
wherein the inline packet processing module stores the entry to the replication table as a replication engine that is associated with the VLAN tag and defines a bitmap, wherein each bit of the bitmap is associated with a logical interface and indicates whether the corresponding logical interface is a member of the VLAN having the scope of one-to-many, parsing the VLAN tag from the header of the data unit,
accesses the replication table using the VLAN tag as an index to retrieve the replication engine of the replication table associated with the VLAN tag, parses the retrieved replication engine to extract the bitmap, and generates a copy for each bit of the bitmap indicating that the corresponding logical interface is a member of the VLAN having the scope of one-to-many.

17. The optical line terminal of claim 10,
wherein one of the one or more ONTs provides connectivity to the OLT for at least one enterprise site operated by an enterprise,
wherein the OLT provides a transparent local area network (TLAN) service that enables a transparent form of layer 2 (L2) interconnectivity between the at least one enterprise site and another enterprise site operated by the same enterprise such that the at least one enterprise site and the other enterprise site appear directly interconnected to one another, and
wherein the customer interface receives a data unit from the one of the one or more ONTs providing connectivity to the OLT for the at least one enterprise site via one of the plurality of logical interfaces supported by the at least one single physical interface and outputs the at least one copy of the data unit back to the one of the one or more ONTs that provides connectivity to the OLT for the at least one enterprise site via at least one of the remaining plurality of logical interfaces different from the one of the logical interface from which the data unit was originally received.

18. The optical line terminal of claim 10,
wherein the customer interface supports a first logical interface of the one or more different logical interfaces and receives a data unit via the first logical interface,
wherein the data path of the optical line terminal determines whether the data unit received via the first logical interface is a candidate for replication to create multiple copies of the data unit received via the first logical interface based on whether the data unit received via the first logical interface is a candidate for hairpin replication,
wherein the inline packet processing module performs replication to generate at least one copy of the data unit received via the first logical interface based on the determination that the data unit received via the first logical interface is a candidate for hairpin replication, and
wherein the customer interface outputs the at least one copy of the data unit received via the first logical interface to the one or more ONTs via the one or more different logical interfaces except the first logical interface.

19. A network system comprising:
a public network;
one or more optical network terminals (ONTs);
a plurality of customer premises equipment coupled to the one or more ONTs; and
an optical line terminal (OLT), wherein the OLT comprises:
a customer interface that supports one or more different logical interfaces to which the plurality of optical network terminals (ONTs) couple;
a network interface that receives a data unit from the public network;
a conversion unit located in a data path of the optical line terminal that determines whether the received data unit is a candidate for replication to create multiple copies of the data unit,
wherein the conversion unit includes an inline packet processing module that performs replication to generate at least one copy of the data unit based on the determination that the received packet is a candidate for packet replication, and
wherein the customer interface outputs the at least one copy of the data unit to the one or more ONTs.

20. The network system of claim 19, further comprising first and second enterprise sites operated by an enterprise,
wherein one of the one or more ONTs provide connectivity to the OLT for the at least one of the first and second enterprise sites,
wherein the OLT provides a transparent local area network (TLAN) service that enables a transparent form of layer 2 (L2) interconnectivity between the first and second enterprise sites such that the first enterprise site and second enterprise site appear directly interconnected to one another,
wherein the customer interface receives a data unit from the one of the one or more ONTs providing connectivity to the OLT for the first enterprise site via one of the plurality of logical interfaces supported by the customer interface and outputs the at least one copy of the data unit back to the one of the one or more ONTs that provides connectivity to the OLT for the second enterprise site via at least one of the remaining plurality of logical interfaces different from the one of the logical interface from which the data unit was originally received.

21. The network system of claim 19,
wherein the customer interface supports a first logical interface of the one or more different logical interfaces and receives a data unit via the first logical interface,
wherein the data path of the optical line terminal determines whether the data unit received via the first logical interface is a candidate for replication to create multiple copies of the data unit received via the first logical interface based on whether the data unit received via the first logical interface is a candidate for hairpin replication, wherein the inline packet processing module performs replication to generate at least one copy of the data unit received via the first logical interface based on the determination that the data unit received via the first logical interface is a candidate for hairpin replication, and wherein the customer interface outputs the at least one copy of the data unit received via the first logical interface to the one or more ONTs via the one or more different logical interfaces except the first logical interface.

22. A non-transitory computer-readable storage medium comprising instructions that cause a processor to:

receive, with an optical line terminal (OLT), a data unit, wherein the OLT couples to one or more optical network terminals (ONTs) via one or more different logical interfaces supported by a single physical interface;

determine, with the OLT, whether the received data unit is a candidate for replication to create multiple copies of the data unit;

perform, with an inline packet processing module located in a data path of the OLT, replication to generate at least one copy of the data unit based on the determination that the received packet is a candidate for packet replication; and output, with the physical interface of the OLT, the at least one copy of the data unit to the one or more ONTs.

23. The non-transitory computer-readable storage medium of claim 22, wherein one of the one or more ONTs provides connectivity to the OLT for at least one enterprise site operated by an enterprise, wherein the OLT provides a transparent local area network (TLAN) service that enables a transparent form of layer 2 (L2) interconnectivity between the at least one enterprise site and another enterprise site operated by the same enterprise such that the at least one enterprise site and the other enterprise site appear directly interconnected to one another, wherein the instructions further cause the processor to:

receive, with the OLT, the data unit from the one of the one or more ONTs providing connectivity to the OLT for the at least one enterprise site via one of the plurality of logical interfaces supported by the single physical interface; and output the at least one copy of the data unit back to the one of the one or more ONTs that provides connectivity to the OLT for the at least one enterprise site via at least one of the remaining plurality of logical interfaces different from the one of the logical interface from which the data unit was originally received.

24. The non-transitory computer-readable storage medium of claim 22, wherein the single physical interface supports a first logical interface of the one or more different logical interfaces and receives a data unit via the first logical interface, wherein the OLT determines whether the data unit received via the first logical interface is a candidate for replication based on whether the data unit received via the first logical interface is a candidate for hairpin replication, wherein the data path of the optical line terminal determines whether the data unit received via the first logical interface is a candidate for replication to create multiple copies of the data unit received via the first logical interface based on whether the data unit received via the first logical interface is a candidate for hairpin replication, wherein the OLT outputs the at least one copy of the data unit received via the first logical interface to the one or more ONTs via the one or more different logical interfaces except the first logical interface.

25. An optical line terminal comprising:

means for receiving, with an optical line terminal (OLT), a data unit, wherein the OLT couples to one or more optical network terminals (ONTs) via one or more different logical interfaces supported by a single physical interface;

means for determining, with the OLT, whether the received data unit is a candidate for replication to create multiple copies of the data unit;

means for performing, with an inline packet processing module located in a data path of the OLT, replication to generate at least one copy of the data unit based on the determination that the received packet is a candidate for packet replication; and means for outputting, with the physical interface of the OLT, the at least one copy of the data unit to the one or more ONTs.

* * * * *